(12) United States Patent
Caffrey

(10) Patent No.: US 7,992,047 B2
(45) Date of Patent: Aug. 2, 2011

(54) CONTEXT SENSITIVE DETECTION OF FAILING I/O DEVICES

(75) Inventor: James M. Caffrey, Woodstock, NY (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 11/970,585

(22) Filed: Jan. 8, 2008

(65) Prior Publication Data

US 2009/0177924 A1      Jul. 9, 2009

(51) Int. Cl.
*G06F 11/00* (2006.01)
(52) U.S. Cl. .................................................. 714/43
(58) Field of Classification Search ................ 714/43
See application file for complete search history.

(56) References Cited

U.S. PATENT DOCUMENTS

| | | | |
|---|---|---|---|
| 5,471,609 A | | 11/1995 | Yudenfriend et al. |
| 5,894,583 A | | 4/1999 | Johnson et al. |
| 6,604,161 B1 | | 8/2003 | Miller |
| 7,437,611 B2 | * | 10/2008 | Agarwal et al. ............... 714/26 |
| 7,502,971 B2 | * | 3/2009 | Cohen et al. .................. 714/45 |
| 7,761,745 B2 | * | 7/2010 | Garbow ........................ 714/47 |
| 2005/0097207 A1 | * | 5/2005 | Gluhovsky et al. ........... 709/224 |
| 2005/0210337 A1 | * | 9/2005 | Chester et al. ................ 714/47 |
| 2006/0201158 A1 | * | 9/2006 | Venkateswaran et al. ...... 60/772 |
| 2007/0001132 A1 | * | 1/2007 | Nishiyama et al. ......... 250/559.4 |
| 2007/0106399 A1 | * | 5/2007 | Korchinski ................... 700/30 |
| 2007/0139809 A1 | * | 6/2007 | Liikanen et al. .............. 360/75 |
| 2009/0149257 A1 | * | 6/2009 | Ferguson et al. ............. 463/37 |

* cited by examiner

*Primary Examiner* — Bryce P Bonzo
(74) *Attorney, Agent, or Firm* — Cantor Colburn LLP; William A. Kinnaman, Jr.

(57) ABSTRACT

Methods for context sensitive detection of failing I/O devices sample and record a response time of an I/O device for each of a first plurality of time intervals to generate a first plurality of sampled and recorded response times, and to determine whether or not at least one I/O error has occurred in each of the first plurality of time intervals. A mathematical model is applied which characterizes the first plurality of sampled and recorded response times. The mathematical model is applied in accordance with an I/O device category corresponding to the I/O device. The mathematical model provides a frame of reference for defining an I/O failure.

20 Claims, 2 Drawing Sheets

CONTEXT SENSITIVE DETECTION OF FAILING I/O DEVICES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to the field of computer systems management and, in particular, to methods, systems, and computer program products for providing context sensitive detection of failing I/O devices.

2. Description of Background

Large computing systems typically include a plurality of processor nodes and I/O devices. The nodes are capable of executing an operating system. A subset of these nodes are designated to act as server nodes. The remaining nodes, designated as non-server nodes, may perform input/output (I/O) operations on an I/O device, such as a data storage device or disk drive, through a server node or over a local path. The operating system is provided with a function to detect when an I/O request to a device has not completed within a reasonable amount of time. This approach is problematic because the concept of a "reasonable" amount of time might vary from situation to situation, and the user does not have sufficient information from which to determine an appropriate waiting time. Oftentimes, the actual length of time that a user waits for an I/O device to respond is much too long. For example, the wait may be caused by a I/O device performing its local recovery. If the local device is successful, then the I/O device is usable, but if the recovery is not successful or takes an excess period of time then the I/O device is unable to perform the necessary function. This results in I/O devices which are not functional being left in the configuration longer than is needed. Work is stalled longer than necessary waiting for the I/O request to complete. Accordingly, what is needed is an improved technique for detecting missing I/O interrupts and failures in I/O devices.

SUMMARY OF THE INVENTION

Methods for context sensitive detection of failing I/O devices sample and record a response time of an I/O device for each of a first plurality of time intervals to generate a first plurality of sampled and recorded response times. The sampled and recorded response times are subsequently used to determine whether or not at least one I/O error has occurred in each of the first plurality of time intervals. A mathematical model is applied which characterizes the first plurality of sampled and recorded response times. The mathematical model categorizes the samples by time, transaction volume or other external information to provide highly accurate models which learn from observing the behavior of the I/O devices. The mathematical model is applied in accordance with an I/O device category corresponding to the I/O device. The mathematical model provides a frame of reference for defining an I/O failure. A test is performed to ascertain whether or not at least one I/O error occurred during the first plurality of sampled and recorded response times. When the first plurality of sampled and recorded response times includes at least one time interval during which an I/O error occurred, the response time of the I/O device is sampled and recorded for each of a second plurality of time intervals to generate a second plurality of sampled and recorded response times. The second plurality of sampled and recorded response times is compared to a set of predicted response times generated using the applied mathematical model. If the second plurality of sampled and recorded response times deviates from the set of predicted response times by at least a user defined amount, then the I/O device is switched to an alternate I/O device, or an alert is triggered, or both.

System and computer program products corresponding to the above-summarized methods are also described and claimed herein. Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
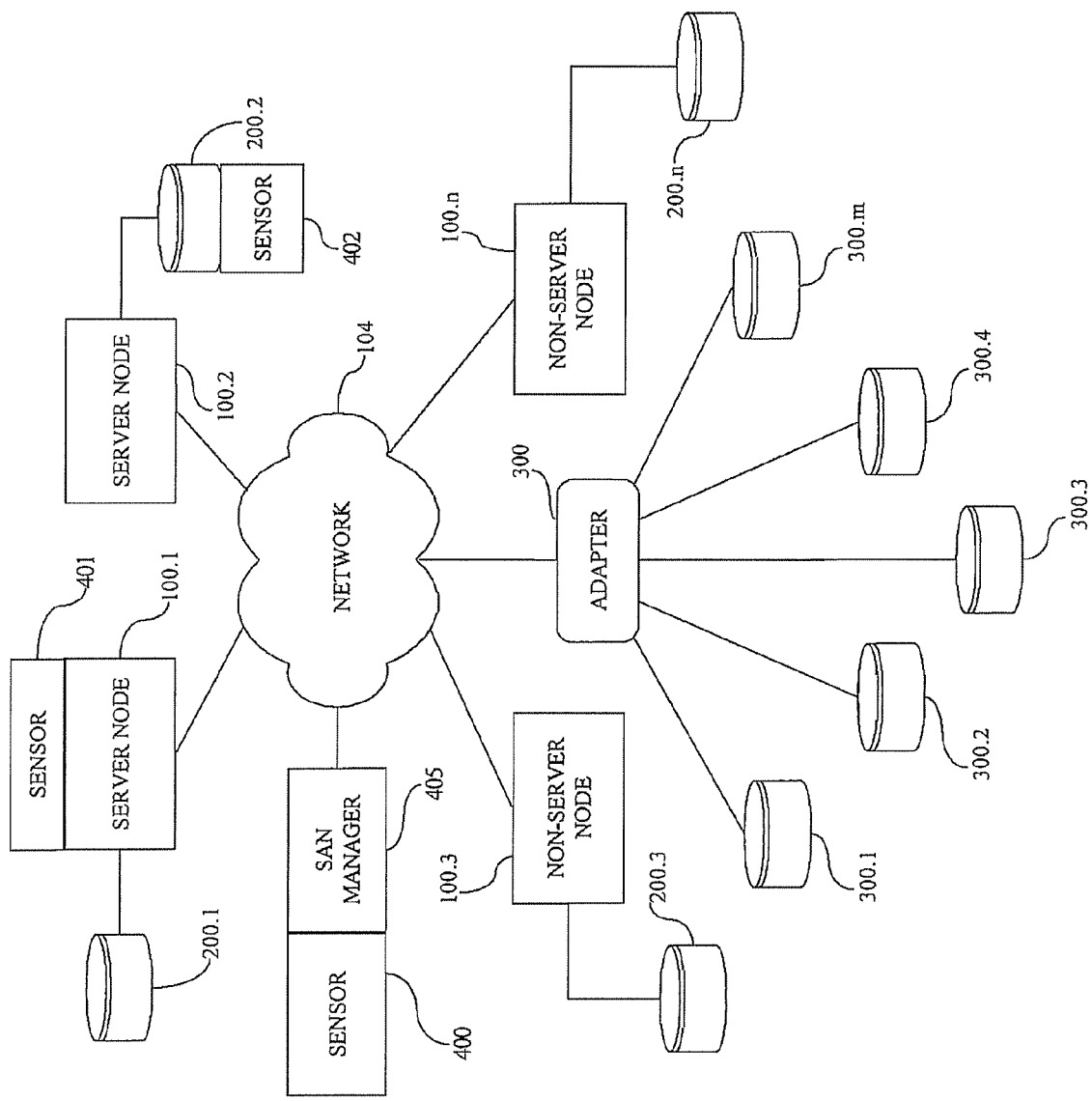
FIG. 1 is a block diagram setting forth an illustrative operational environment in which the present invention is employed.

FIG. 1 is a block diagram setting forth an illustrative operational environment in which the present invention is employed. In particular, a plurality of nodes are interconnected over a network 104. A subset of these nodes are designated to act as server nodes 100.1, 100.2. Although the example of FIG. 1 shows two server nodes 100.1, 100.2, any number of one or more server nodes may be provided. The remaining nodes, designated as non-server nodes 100.3 through 100.n, perform input/output (I/O) operations on a storage device through a server node or over a local path. Nodes 100.1 through 100.n are operably coupled to network 104 through one or more adapters, cables, switches, or any of various combinations thereof.

In preferred embodiments of the present invention, each node 100.i is a processor node capable of communicating with other processor nodes using the publicly defined Transmission Control Protocol/Internet Protocol (TCP/IP) messaging protocol or FIBER Channel or FICON. While this protocol is referred to as an Internet Protocol, it should be noted that use of this term herein does not imply the existence of any Internet connection, nor does it imply dependence upon the Internet in any way. It is simply the name of a conveniently used, well characterized communication protocol suitable for use within a connected network of data processing nodes.

Each node 100.i may include one or more Central Processing Units (CPUs), some or all of which share memory with one another. One or more of these CPUs are capable of implementing an operating system. Each node 100.i may be connected locally to a non-volatile storage device such as a Direct Access Storage Device (DASD) unit or other similar storage device 200.i, where i is an integer greater than or equal to 1, but less than or equal to n. Storage device 200.i typically comprises a rotating magnetic disk storage unit, sometimes referred to as a disk drive. However, the scope of the present invention includes any nonvolatile storage mechanism capable of holding data files. The number n of nodes 100.i is not critical. Furthermore, not everything operably coupled to network 104 has to be a data processing node. A plurality of DASD storage devices 300.1 through 300.m are connected to network 104 using, for example, a network adapter 300 for maintaining communication between DASD storage devices 300.1 to 300.m and network 104.

The system of FIG. 1 includes one or more sensing mechanisms for sampling a response time of an I/O device for each of a first plurality of time intervals to generate a first plurality of sampled response times. These one or more sensing mechanisms may be embedded within the operating system of a server node 100.i, or embedded within a storage device 200.i, or embedded within a storage area network (SAN) manager 405, or embedded within various combinations of the foregoing elements. For illustrative purposes, the configuration of FIG. 1 shows a sensor 402 embedded in storage device 200.2, a sensor 400 embedded in SAN manager 405, and a sensor 401 embedded in server node 100.1. However, it is not required for sensors to be embedded in each of these elements, so long as the configuration of FIG. 1 includes at least one sensor.

Sensors 400, 401, 402 sample the response times of one or more I/O devices such as DASD storage devices 300.1 to 300.m. These response times are stored in a storage mechanism, operatively coupled to the sensors 400, 401, 402. For example, information sampled by sensor 401 may be stored at server node 100.1, information sampled by sensor 400 may be stored at SAN manager 405, and information sampled by sensor 402 may be stored at storage device 200.i. The stored information is accessed by a processing mechanism, such as server node 100.1, or server node 100.2, or SAN manager 405, or any of various combinations thereof. The processing mechanism uses the first plurality of sampled response times to determine whether or not at least one I/O error has occurred in each of a first plurality of time intervals, as will be described in greater detail with reference to FIG. 2.

Figure 2:
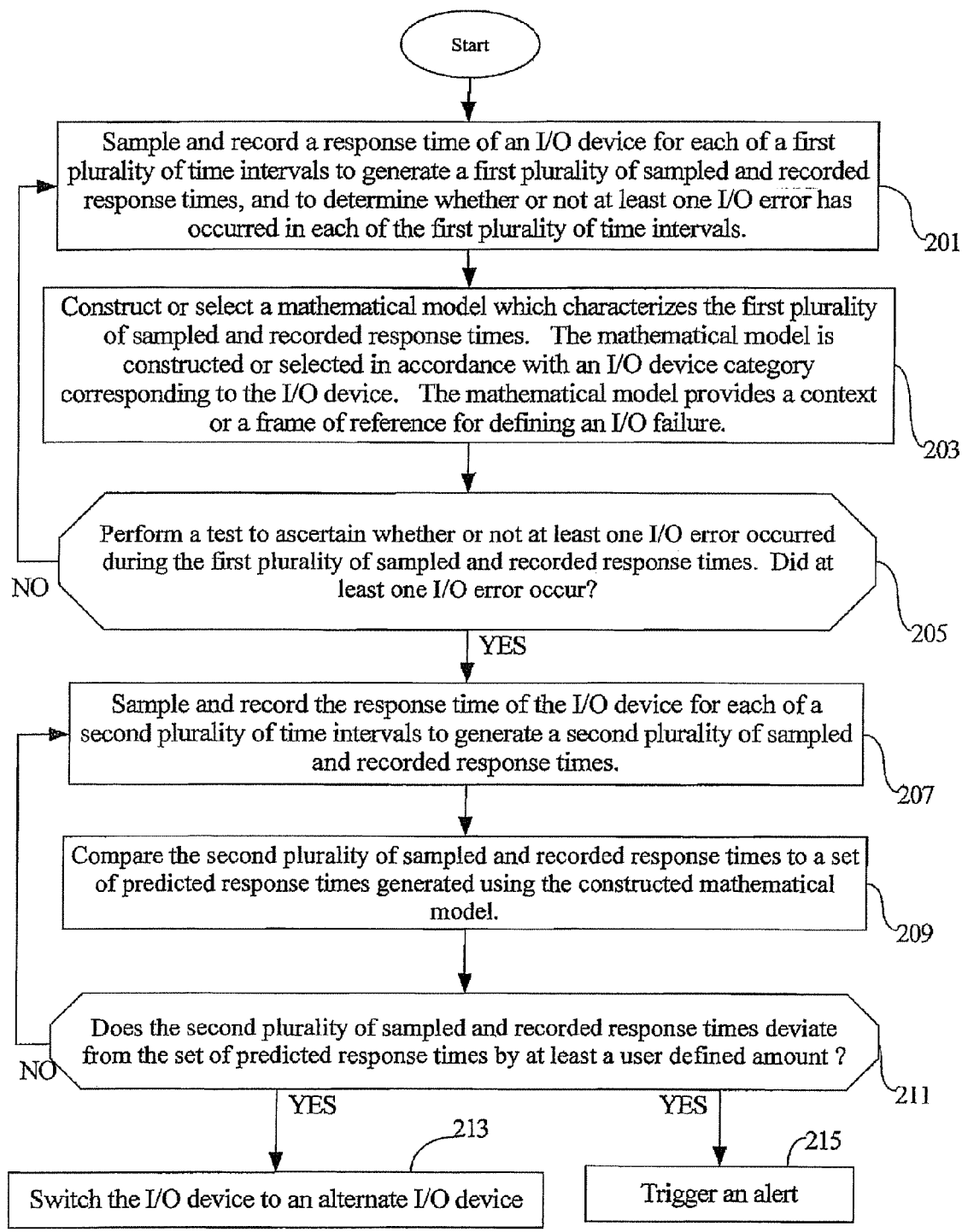
FIG. 2 is a flowchart setting forth an illustrative operational sequence for providing context sensitive detection of failing I/O devices.

FIG. 2 is a flowchart setting forth an illustrative operational sequence for providing context sensitive detection of failing I/O devices. The procedure commences at block 201 where a response time of an I/O device is sampled and recorded for each of a first plurality of time intervals to generate a first plurality of sampled and recorded response times. The results of block 201 are used later to determine whether or not an error has occurred. For purposes of illustration, an I/O error may include one or more missing interrupts. Next, at block 203, a mathematical model is constructed or selected which characterizes the first plurality of sampled and recorded response times. The mathematical model is constructed or selected in accordance with an I/O device category corresponding to the I/O device. For example, a probability model using binomial distribution may be appropriate in situations where the response time is stable over time. If the response time varies over time, then a model based upon a categorical analysis regression tree may be appropriate. The acceptable behavior of the I/O device will determine which mathematical model is constructed or selected. Essentially, the mathematical model provides a context or a frame of reference for defining an I/O failure. A test is performed to ascertain whether or not at least one I/O error occurred during the first plurality of sampled and recorded response times (block 205). If not, the program loops back to block 201, as the purpose here is to characterize the response-time distribution in the presence of an error. Errors can be detected with reference to an observed response-time distribution that exists in the presence of an error. Errors can also be detected via missing interrupts.

The affirmative branch from block 205 leads to block 207 where the response time of the I/O device is sampled and recorded for each of a second plurality of time intervals to generate a second plurality of sampled and recorded response times. At block 209, the second plurality of sampled and recorded response times is compared to a set of predicted response times generated using the constructed mathematical model. Next, at block 211, a test is performed to ascertain whether or not the second plurality of sampled and recorded response times deviates from the set of predicted response times by at least a user defined amount. When the second plurality of sampled and recorded response times deviates from the set of predicted response times by at least a user defined amount, then the I/O device is switched to an alternate I/O device (block 213), or an alert is triggered (block 215), or both. For example, an alert in the form of an email or electronic message could be triggered if the second plurality of sampled and recorded response times deviates from the set of predicted response times by N standard deviations, or if an observed I/O response time was at least M times longer than predicted by the mathematical model. Illustratively, M and N are positive integers greater than one. For example, N could be three and M could be four. The negative branch from block 211 leads back to block 207.

The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer (such as, for example, one or more processing nodes 100.i of FIG. 1), the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for context sensitive detection of a failing I/O device, the method comprising:
    sampling and recording a response time of an I/O device for each of a first plurality of time intervals to generate a first plurality of sampled and recorded response times;
    applying a mathematical model which characterizes the first plurality of sampled and recorded response times, the mathematical model providing a frame of reference for defining an I/O failure;
    performing a test to ascertain whether or not at least one I/O error occurred during the first plurality of sampled and recorded response times wherein, when the first plurality of sampled and recorded response times includes at least one time interval during which an I/O error occurred, the response time of the I/O device is sampled and recorded for each of a second plurality of time intervals to generate a second plurality of sampled and recorded response times;
    comparing the second plurality of sampled and recorded response times to a set of predicted response times generated using the applied mathematical model;
    when the second plurality of sampled and recorded response times deviates from the set of predicted response times by at least a user defined amount, then switching the I/O device to an alternate I/O device.

2. The method of claim 1 wherein the mathematical model is applied in accordance with an I/O device category corresponding to the I/O device.

3. The method of claim 1 wherein the applied mathematical model is a probability model using a binomial distribution when the response time of the I/O device is stable over time.

4. The method of claim 1 wherein the applied mathematical model is based upon a categorical analysis regression tree when the response time of the I/O device varies over time.

5. The method of claim 1 wherein the at least one I/O error includes a missing interrupt.

6. The method of claim 1 wherein the alert is an electronic message.

7. The method of claim 6 wherein the alert is triggered if the second plurality of sampled and recorded response times deviates from the set of predicted response times by N standard deviations, or if an observed I/O response time is at least M times longer than predicted by the mathematical model, wherein M and N each represent positive real numbers greater than one.

8. A computer program product comprising a storage medium readable by a processing circuit and storing instructions for execution by the processing circuit for facilitating a method for providing context sensitive detection of a failing I/O device, the method comprising:
    sampling and recording a response time of an I/O device for each of a first plurality of time intervals to generate a first plurality of sampled and recorded response times;
    applying a mathematical model which characterizes the first plurality of sampled and recorded response times, the mathematical model providing a frame of reference for defining an I/O failure;
    performing a test to ascertain whether or not at least one I/O error occurred during the first plurality of sampled and recorded response times wherein, when the first plurality of sampled and recorded response times includes at least one time interval during which an I/O error occurred, the response time of the I/O device is sampled and recorded for each of a second plurality of time intervals to generate a second plurality of sampled and recorded response times;
    comparing the second plurality of sampled and recorded response times to a set of predicted response times generated using the applied mathematical model;
    when the second plurality of sampled and recorded response times deviates from the set of predicted response times by at least a user defined amount, then switching the I/O device to an alternate I/O device.

9. The computer program product of claim 8 wherein the mathematical model is applied in accordance with an I/O device category corresponding to the I/O device.

10. The computer program product of claim 8 wherein the applied mathematical model is a probability model using a binomial distribution when the response time of the I/O device is stable over time.

11. The computer program product of claim 8 wherein the applied mathematical model is based upon a categorical analysis regression tree when the response time of the I/O device varies over time.

12. The computer program product of claim 8 wherein the at least one I/O error includes a missing interrupt.

13. The computer program product of claim 8 wherein the alert is an electronic message.

14. The computer program product of claim 13 wherein the alert is triggered if the second plurality of sampled and recorded response times deviates from the set of predicted response times by N standard deviations, or if an observed I/O response time is at least M times longer than predicted by the mathematical model, wherein M and N each represent positive real numbers greater than one.

15. A system for providing context sensitive detection of a failing I/O device, the system comprising:
    a sensing mechanism for sampling a response time of an I/O device for each of a first plurality of time intervals to generate a first plurality of sampled response times;
    a storage mechanism, operatively coupled to the sensing mechanism, for storing the first plurality of sampled response times to provide a first plurality of sampled and recorded response times;
    a processing mechanism, operatively coupled to the storage mechanism, for using the first plurality of sampled response times to determine whether or not at least one I/O error has occurred in each of the first plurality of time intervals;
    the processing mechanism applying a mathematical model which characterizes the first plurality of sampled and recorded response times, the mathematical model providing a frame of reference for defining an I/O failure;
    the processing mechanism performing a test to ascertain whether or not at least one I/O error occurred during the first plurality of sampled and recorded response times wherein, when the first plurality of sampled and recorded response times includes at least one time interval during which an I/O error occurred, the response time of the I/O device is sampled and recorded for each of a second plurality of time intervals to generate a second plurality of sampled and recorded response times;

the processing mechanism comparing the second plurality of sampled and recorded response times to a set of predicted response times generated using the applied mathematical model;

when the second plurality of sampled and recorded response times deviates from the set of predicted response times by at least a user defined amount, the processing mechanism initiating a switching of the I/O device to an alternate I/O device.

16. The system of claim 15 wherein the processing mechanism applies the mathematical model in accordance with an I/O device category corresponding to the I/O device.

17. The system of claim 15 wherein the mathematical model applied by the processing mechanism is a probability model using binomial distribution when the response time of the I/O device is stable over time.

18. The system of claim 15 wherein the mathematical model applied by the processing mechanism is based upon a categorical analysis regression tree when the response time of the I/O device varies over time.

19. The system of claim 15 wherein the at least one I/O error includes a missing interrupt.

20. The system of claim 15 wherein the alert is an electronic message, and wherein the alert is triggered if the second plurality of sampled and recorded response times deviates from the set of predicted response times by N standard deviations, or if an observed I/O response time is at least M times longer than predicted by the mathematical model, wherein M and N each represent positive real numbers greater than one.

* * * * *